Patented May 4, 1943

2,318,035

UNITED STATES PATENT OFFICE 2,318,035

PROCESS AND REAGENT FOR RESOLVING EMULSIONS

Truman B. Wayne, Houston, Tex.

No Drawing. Application March 25, 1939,
Serial No. 264,235

18 Claims. (Cl. 252—341)

This invention relates to a process of resolving petroleum emulsions of the character commonly encountered in the production, handling and refining of petroleum.

The principal object of this invention is to provide an improved process and reagents for treating petroleum emulsions to separate them into their component parts of oil and water.

Another object is to provide a novel product or reagent which is water-wettable, interfacial and surface-active in order to enable its employment as a demulsifier or for such uses where water-wettable properties and characteristics are necessary or desirable.

Further objects will appear from the following, in which the reagents and the process for their employment will be described as related to their employment for the treating of petroleum emulsions.

The present invention is based on the discovery that various esters of the oxy-acids of phosphorus are valuable demulsifying agents for the roily or emulsified oils commonly encountered in the production and refining of petroleum oils. They may be defined as phosphorous or phosphoric acids, which have been partially or completely esterified with hydroxylated aliphatic bodies containing one or more hydroxyl groups.

In the preferred embodiments of my invention the phosphorus acid or its corresponding anhydride, or a phosphorus halide, is reacted with a hydroxylated fatty body to produce a partial ester of the corresponding oxy-acid of phosphorus, and the residual acid valence or valences of the ester are neutralized with a suitable alkali metal hydroxide, ammonia, or an amine to form a salt, or it may be converted to an ester or amide by appropriate procedure. A number of variations of this general procedure are hereinafter disclosed.

The preferred phosphorus acids are metaphosphoric acid, pyrophosphoric acid, tetraphosphoric acid or other polymerized and/or condensed forms of orthophosphoric acid, for the reason that all of these may be obtained in substantially anhydrous form. They therefore readily esterify the hydroxylated aliphatic body to form an ester of a phosphoric acid in the series including the esterifying acid, but exceeding it in degree of hydration. For instance, an ester prepared from one mol of a mono-hydroxylated fatty acid such as ricinoleic acid, and one mol of glacial metaphosphoric acid will yield the mono-ricinoleyl ester of ortho-phosphoric acid, and so on. Phosphorus pentoxide may be used to form esters by direct addition to the hydroxylated body. For instance, two molecules of ricinoleic acid when reacted with one molecule of phosphorus pentoxide yields one molecule of the di-ricinoleyl ester of pyrophosphoric acid. Phosphorus trihalogenides and pentahalogenides, or phosphorus oxyhalogenides, may likewise be reacted with the hydroxylated fatty body, followed by decomposition of the residual halide groups on the ester to form the corresponding ester of phosphorous or phosphoric acid. Any known method of esterification may be used in the production of these esters of the oxy-acids of phosphorus.

The hydroxylated aliphatic body is preferably a hydroxylated fatty acid or hydroxylated fatty acid ester having seven or more carbon atoms in the hydrocarbon chain. Likewise, the higher fatty alcohols, or alkylolamine salts or amides of the soap-forming acids are suitable. By the term "soap-forming bodies" is meant to include all of the soap-forming fatty acids, resin acids, naphthenic acids, and the like which contain one or more hydroxyl groups either on the hydrocarbon chain or on some group attached to the hydrocarbon chain. Soap forming bodies which have been hydroxylated by blowing with air or by other means are also contemplated as suitable hydroxylated bodies.

If the phosphorus acid ester so produced is still hydroxy, as is possible when polyhydroxy aliphatic bodies are used, they may be further reacted with polycarboxy acids such as phthalic, terephthalic, diphenic, succinic, citric, maleic, fumaric, adipic, tartaric, oxalic, pumelic, suberic, azelaic, and sebacic acids or their corresponding anhydrides to produce even more complex products whose efficiency as petroleum demulsifying agents is enhanced because of their resinous nature. The polybasic acids used are not necessarily polycarboxy but they must contain at least one carboxyl group in addition to any other acidic function capable of reacting in the manner above described. While polycarboxy acids such as those listed above are preferred, one may likewise employ a polybasic acid such as sulfobenzoic acid which contains but one carboxyl group but has also a sulfo group. It is therefore within the meaning of the term "polybasic carboxy acid" as used in the specification and claims. Likewise, one may employ a polybasic polycarboxy acid which contains two or more carboxyl groups, and also a sulfo group. Such acid or anhydride is both polybasic and polycarboxy. For instance, sulfo-phthalic anhydride is tribasic, having two carboxyl equivalents plus one sulfo group.

The distinguishing structural characteristics of the new type of petroleum demulsifier herein disclosed are one or more aliphatic groups esterified through their hydroxyl group or groups with one or more residues from a phosphorus acid. The residual acid groups on the resulting ester may be free, or may be neutralized, esterified or aminated by conventional procedures. Briefly, they may be represented by the following type formula:

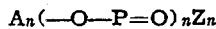

wherein A is an alkyl group, (—O—P=O) represents the oxy-phosphorus acid residue, Z is the acidic function of the (—O—P=O) residue which may also include the salt, ester or amide thereof, and $n$ represents the number 1 or more. Of course, if A is polyhydroxy, other groups such as polycarboxy acid residues or other ester groups may be attached to it, or other groups may be attached by addition at its points of unsaturation. Likewise, if Z is produced by neutralization, esterification or amidification of the original acid groups attached to the (—O—P=O) group, and such groups contain hydroxyl or amino groups, further substitution or additions are also possible at Z. In all instances, however, the product is basically characterized by the presence of the alkyl residue A attached to the phosphorus atom through an intervening —O— atom, if the present accepted conception of such linkages is correct.

In order to illustrate specifically the new type of condensation product contemplated for use in accordance with the present invention, I have set forth below several examples of the type of product suitable for use. However, it is to be understood that I do not confine myself to the specific chemicals, or proportions thereof, set forth in these examples, as it will be readily apparent that equivalents of these specific chemicals and their various derivatives, or other proportions may be employed without departing from the spirit of the invention or the scope of the appended claims.

Example 1

300 parts of ricinoleic acid were mixed with 100 parts of glacial metaphosphoric acid and heated to 200° C. while stirring vigorously to prevent localized reaction. The mass became quite thick and finally yielded a reddish brown, oily liquid of about the consistency of blown castor oil. It was washed with brine to free it from phosphoric acid, separated from the brine, dried, and carefully neutralized with triethanolamine. The original acid ester or a sodium or ammonium salt, or an ester, are all suitable demulsifying agents.

Example 2

370 parts of diethylene glycol mono-oleate were heated with 338 parts of tetraphosphoric acid at 200° C. for two hours. The dark-brown, heavy liquid was then refluxed with 120 parts of anhydrous isopropyl alcohol to esterify part of the remaining acidity of the ester. The product is an efficient demulsifying agent as such, or may be converted to a salt, or to an amine salt or an amide.

Example 3

The mono-ricinoleyl amide of mono-ethanolamine was prepared in the usual manner from 300 parts of ricinoleic acid and 65 parts of mono-ethanolamine. The resulting amide was then reacted with one molecular equivalent of phosphorus pentoxide. The reaction product probably has the following structure:

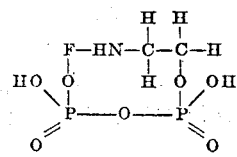

wherein F represents the fatty ricinoleyl group.

Example 4

936 parts of castor oil were mixed with 142 parts of phosphorus pentoxide and warmed to 40° C. The ensuing reaction raised the temperature to 110° C., after which the temperature was raised to 200° C. The mass became very thick so was diluted at this stage with 600 parts of pine oil. The resulting addition product was a clear, oily, reddish-brown oil which is partially dispersible in water. Upon stirring into water, it forms a creamy emulsion which separates as a thick, pasty mass from the excess of water. The product may be used as such in the resolution of petroleum emulsions, or may be converted into a salt, ester, or amide.

Example 5

One-half molecular equivalent of the acid ester prepared according to Example 4 was neutralized with one molecular equivalent of technical monoamylamine propane diol to form the amine salt. 148 parts of phthalic anhydride were then added together with 200 parts of pine oil as diluent, and the mass was heated at 125° to 150° C. for four hours to form the resinous dicarboxylic ester.

Instead of phthalic anhydride, any other polybasic acid or anhydride may be used. Monoamylamine propane diol may be replaced by any other hydroxylated aliphatic, alicyclic, aryl or aralkyl amine.

Example 6

A resinous fatty modified polyhydric alcohol-polybasic acid ester may be prepared by any suitable procedure so that free hydroxyl groups remain for reaction with a phosphoric acid. For example, 936 parts of castor oil are diluted with 600 parts of pine oil and reacted at 125–150° centigrade with 148 parts of phthalic anhydride to form the ester. To the ester are added 142 parts of phosphorus pentoxide at 40° centigrade. After the initial temperature rise has subsided, the mass is heated at 150–200° centigrade for two hours to form the pyrophosphoric acid ester of the resin body.

In similar manner, metaphosphoric acid, tetraphosphoric acid, or other anhydrous or nearly anhydrous acid or halide of phosphorus may be used in the esterification procedure. If desired, the fatty modified polyhydric alcohol-polybasic acid resin ester may have been neutralized with a hydroxylated amine before reaction with the polybasic acid, or part of the hydroxyl groups necessary to the formation of the resin ester may be supplied by using a hydroxylated amine as one of the components of the resin ester before reacting it with the phosphorus acid, anhydride, or halide.

The above examples are only a few of the many products which may be prepared according to the principles disclosed in the foregoing discussion. It is also contemplated that other groups such as the sulfo group may be introduced into the molecule either by previously sulfonating one or more of the component materials such as the fatty body or the polycarboxy acid, or by sulfonating the finished product. However, such procedure is seldom desirable since the phosphorated product is usually sufficiently hydrophilic, although petroleum emulsions may be encountered which respond more readily to treating agents having both the phospho and sulfo groups. Indeed, it is very reasonable to believe that if such sulfo group is converted to an N-alkylated amine salt or sulfonamide, that the efficiency of the product is improved for use on certain emulsions, as it is now well known in this art that demulsifiers possessing such groups or radicals are unusually valuable for the resolution and/or prevention of emulsions of the water-in-oil type.

Various examples of the many products which answer the descriptions herein made are contemplated. Some may be oil soluble, others water soluble. In many instances they may possess dual solubility to an appreciable extent. Even apparent insolubility is of no consequence, as the products are all soluble at least to the extent necessary for segregation at the emulsion interface as a water-wettable colloid. The suitability of any of these products to the breaking and resolving of any given emulsion can readily be determined by the conventional procedures now in general use in oil fields and in laboratories which make such determinations.

Where reference is made to "sulfo" groups, it is understood that these include $OSO_3H$ and $SO_3H$ groups, and their neutralization products.

Where reference is made to "phospho" groups, it is understood to include residues from partially or completely esterified phosphoric or phosphorous acids or the corresponding anhydrides or halides. Where "phosphorus acid" is referred to in the claims it will be understood that it includes the phosphorus acid as well as its anhydried or its halide. Where, in the claims, "the acidic function" is referred to, it will be understood that this may also include the salt, ester, or amide thereof.

Where reference is made to "soap-forming acids", it is understood to include aliphatic acids having eight or more carbon atoms in their hydrocarbon chain, rosin and resin acids, naphthenic acids, and the like. The term "soap-forming" refers to these acids and also sulfonic acids derived from various aliphatic, alicyclic, hydroaromatic and aromatic bodies found in, or derived from, coal tar, asphalt, petroleum, etc.

Where reference is made to polycarboxy acids in the appended claims, it is understood that this term is meant to also include the corresponding anhydrides, as will be noted by reference to the examples hereinbefore given.

The term "water-wettable" as used in the specification and claims refers to the characteristic of the product which enables it to be readily wetted by water and which is usually accompanied by some degree of hydration of the product in contact with the aqueous phase of the emulsion. When the product segregates at the interface of the emulsion and is adsorbed at the interfacial film where the hydrophobe body responsible for the emulsion exists, the water-wettable property of this product counteracts the effect of the hydrophobe present in the emulsion and thus effects its resolution.

The term "water-soluble" is used to include the property of forming colloidally hydrated aqueous solution. From the following paragraph it will be seen that only a limited degree of actual "water solubility" is necessary for the reagents used for breaking petroleum emulsions, for the reason that extremely small proportions of the reagents are ordinarily used.

The term "oil soluble" is used to include the property of colloidal dispersion in the oil phase.

The improved treating agents prepared in accordance with the present invention are used in the proportion of one part of treating agent to from 2,000 to 20,000 parts (or, in some cases, as high as 30,000 parts) of petroleum emulsion, either by adding the concentrated product directly to the emulsion or after diluting with water or oil in the conventional manner. The treating agents may be used in any of the numerous ways commonly employed in the treatment of petroleum emulsions as will be apparent.

I claim:

1. A petroleum demulsifying composition which comprises as a component a hydrophilic, surface-active aliphatic ester of a phosphorus acid, characterized by the presence of at least one alkyl radical containing at least seven carbon atoms in its alkyl chain, further characterized by the aliphatic residue of said ester being otherwise free of a sulfonic acid residue substituent of a polyhydric alcohol residue of a fatty acid ester, and further characterized by its property of being dispersed as a hydrophile colloid at the oil-water interface of a water-in-oil emulsion.

2. A petroleum demulsifying composition which comprises as a component an hydrophilic, surface-active ester of a phosphorus acid and a hydroxylated aliphatic body containing at least seven carbon atoms in its alkyl chain, characterized by the aliphatic residue of said ester being otherwise free of a sulfonic acid residue substituent of a polyhydric alcohol residue of a fatty acid ester.

3. A petroleum demulsifying composition which comprises as a component an hydrophilic, surface-active aliphatic ester of a phosphorus acid, characterized by the presence of at least one alkyl radical containing at least seven carbon atoms in its alkyl chain, further characterized by the aliphatic residue of said ester being otherwise free of a sulfonic acid residue substituent of a polyhydric alcohol residue of a fatty acid ester, and further characterized by the presence of a group derived from a substituted ammonium compound, and by the property of said ester of being dispersed as a hydrophile colloid at the oil-water interface of a water-in-oil emulsion.

4. A petroleum demulsifying composition which comprises as a component an hydrophilic, surface-active ester of a phosphorus acid and a hydroxylated aliphatic body containing at least seven carbon atoms in its alkyl chain, characterized by the aliphatic residue of said ester being otherwise free of a sulfonic acid residue substituent of a polyhydric alcohol residue of a fatty acid ester, and further characterized by the presence of a group derived from a substituted ammonium compound.

5. A petroleum demulsifying composition which comprises as a component an hydrophilic, surface-active ester of a phosphorus acid prepared from a phosphorus acid and a hydroxylated fatty body containing at least seven carbon atoms in its alkyl radical, characterized by the aliphatic residue of said ester being otherwise free of a sulfonic acid residue substituent of a polyhydric alcohol residue of a fatty acid ester.

6. A petroleum demulsifying composition which comprises as a component an hydrophilic, surface-active ester of a phosphorus acid prepared from a phosphorus acid, a hydroxylated fatty body containing at least seven carbon atoms in its alkyl radical, and a hydroxylated amine, characterized by the aliphatic residue of said ester being otherwise free of a sulfonic acid residue substituent of a polyhydric alcohol residue of a fatty acid ester.

7. A petroleum demulsifying composition which comprises as a component an hydrophilic, surface-active aliphatic ester of a phosphorus acid condensed with a polybasic carboxy acid, and produced by an esterification reaction between at least one acid group of the polybasic acid and at least one alcoholic hydroxyl group of a hydroxylated alkyl body, said ester characterized by its property of being dispersed as a hydrophile colloid at the oil-water interface of a water-in-oil emulsion.

8. A petroleum demulsifying composition which comprises as a component an hydrophilic, surface-active aliphatic ester of a phosphorus acid condensed with a polybasic carboxy acid, characterized by the presence of a group derived from a substituted ammonium compound, and by the property of said ester of being dispersed as a hydrophile colloid at the oil-water interface of a water-in-oil emulsion.

9. A petroleum demulsifying composition which comprises as a component an hydrophilic, surface-active ester of a phosphorus acid and a hydroxylated aliphatic body containing at least seven carbon atoms in its alkyl chain, condensed with a polycarboxy acid and produced by an esterification reaction between at least one acid group of the polybasic acid and at least one alcoholic hydroxyl group of a hydroxylated alkyl body.

10. A petroleum demulsifying composition which comprises as a component an hydrophilic, surface-active ester of a phosphorus acid condensed with a polycarboxy acid and a hydroxylated aliphatic body containing at least seven carbon atoms in its alkyl chain, characterized by the presence of a group derived from a substituted ammonium compound, and by the property of said ester of being dispersed as a hydrophile colloid at the oil-water interface of a water-in-oil emulsion.

11. A petroleum demulsifying composition which comprises as a component an hydrophilic, surface-active aliphatic ester of a phosphorus acid of the type formula $$A_n(-O-P=O)_nZ_n$$

wherein A is an alkyl group derived from a hydroxylated aliphatic body and having at least seven carbon atoms in its alkyl chain, (—O—P=O) represents the oxy-phosphorus acid residue, Z is the acidic function of the (—O—P=O) residue and n represents a numeral which is at least one, characterized by the aliphatic residue of said ester being otherwise free of a sulfonic acid residue substituent of a polyhydric alcohol residue of a fatty acid ester, and further characterized by its property of being dispersed as a hydrophile colloid at the oil-water interface of a water-in-oil emulsion.

12. A petroleum demulsifying composition which comprises as a component an hydrophilic, surface-active aliphatic ester of a phosphorus acid of the type $$A_n(-O-P=O)_nZ_n$$

wherein A is an alkyl group derived from a hydroxylated aliphatic body and having at least seven carbon atoms in its alkyl chain, (—O—P=O) represents the oxy-phosphorus acid residue, Z is the acidic function of the (—O—P=O) residue and n represents a numeral which is at least one, characterized by the aliphatic residue of said ester being otherwise free of a sulfonic acid residue substituent of a polyhydric alcohol residue of a fatty acid ester, and further characterized by the presence of a group derived from a substituted ammonium compound and by the property of said ester of being dispersed as a hydrophile colloid at the oil-water interface of a water-in-oil emulsion.

13. A petroleum demulsifying composition which comprises as a component an hydrophilic, surface-active phosphorus acid ester of a hydroxylated fatty modified polyhydric alcohol-polybasic carboxy acid compound of the type formula $$A_n(-O-P=O)_nZ_n$$

wherein A is an alkyl group to which is attached at least one polybasic carboxy acid residue attached directly to a radical derived from an hydroxylated alkyl body, (—O—P=O) represents the oxy-phosphorus acid residue, Z is the acidic function, and n is a numeral which is at least one, characterized by the property of said ester of being dispersed as a hydrophile colloid at the oil-water interface of a water-in-oil emulsion.

14. A petroleum demulsifying composition which comprises as a component a hydrophilic, surface-active phosphorus acid ester of a hydroxylated alkyl compound of the type formula $$A_n(-O-P=O)_nZ_n$$

wherein A is an alkyl group which is further substituted by at least one polybasic acid residue attached directly to a radical derived from a hydroxylated alkyl body, (—O—P=O) represents the oxy-phosphorus acid residue, Z is the acidic function containing a hydroxy amine residue condensed with a polybasic carboxy acid residue and n represents a numeral which is at least one, characterized by the property of said ester of being dispersed as a hydrophile colloid at the oil-water interface of a water-in-oil emulsion.

15. In the process of breaking petroleum emulsions, the step of adding thereto a demulsifying composition which comprises as a component a hydrophilic, surface-active aliphatic ester of a phosphorus acid, characterized by the presence of at least one alkyl radical containing at least seven carbon atoms in its alkyl chain, further characterized by the aliphatic residue of said ester being otherwise free of a sulfonic acid residue substituent of a polyhydric alcohol residue of a fatty acid ester, and further characterized by its property of being dispersed as a hydrophile colloid at the oil-water interface of a water-in-oil emulsion.

16. In the process of breaking petroleum emulsions, the step of adding thereto a demulsifying composition which comprises as a component a hydrophilic, surface-active aliphatic ester of a phosphorus acid of the type formula $$A_n(-O-P=O)_nZ_n$$

wherein A is an alkyl group derived from a hydroxylated aliphatic body and having at least seven carbon atoms in its alkyl chain, (—O—P=O) represents the oxy-phosphorus acid residue, Z is the acidic function of the (—O—P=O) residue, and $n$ represents a numeral which is at least one, characterized by the aliphatic residue of said ester being otherwise free of a sulfonic acid residue substituent of a polyhydric alcohol residue of a fatty acid ester, and further characterized by the property of said ester of being dispersed as a hydrophile colloid at the oil-water interface of a water-in-oil emulsion.

17. A petroleum demulsifying composition which comprises as a component a hydrophilic, surface-active phosphorus acid ester of a hydroxylated alkyl compound of the type formula $$A_n(-O-P=O)_nZ_n$$

wherein A is an alkyl group, (—O—P=O) represents the oxyphosphorus acid residue and $n$ represents a numeral which is at least one, Z is the acidic function containing a hydroxy amine residue condensed with a polybasic carboxy acid residue, characterized by the property of said ester of being dispersed as a hydrophile colloid at the oil-water interface of a water-in-oil emulsion.

18. A petroleum demulsifying composition which comprises as a component a hydrophilic, surface-active condensation product derived from the reaction of (a) castor oil, (b) a phosphoric acid selected from the group comprising metaphosphoric acid, tetraphosphoric acid, and phosphorus pentoxide, and (c) phthalic anhydride.

TRUMAN B. WAYNE.